June 26, 1945.    G. W. HARDMAN    2,379,352
AIRCRAFT WING
Filed April 1, 1941    4 Sheets-Sheet 1
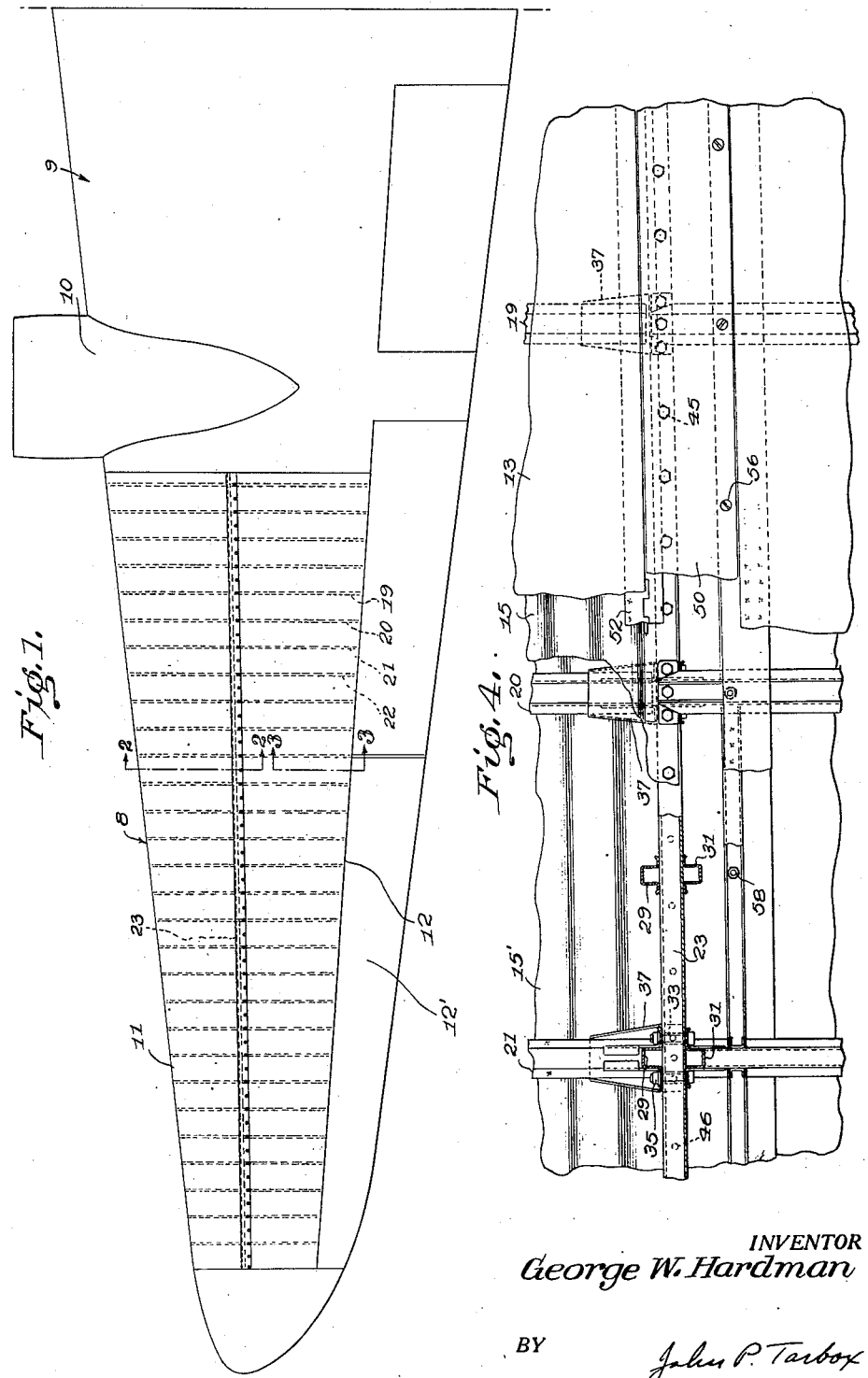
INVENTOR
George W. Hardman
BY
John P. Tarbox
ATTORNEY June 26, 1945.　　G. W. HARDMAN　　2,379,352
AIRCRAFT WING
Filed April 1, 1941　　4 Sheets-Sheet 2
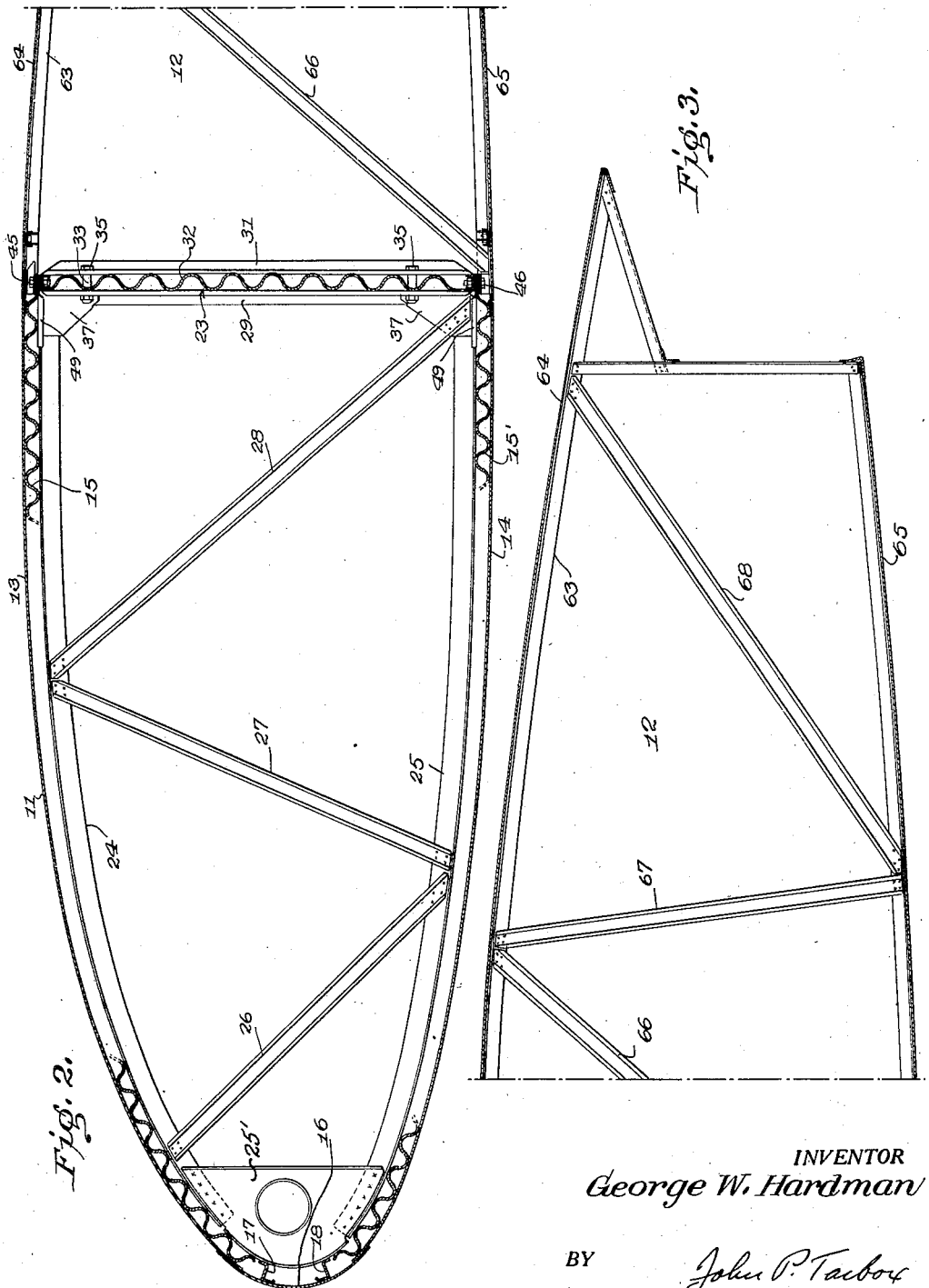
INVENTOR
George W. Hardman
BY
John P. Tarbox
ATTORNEY

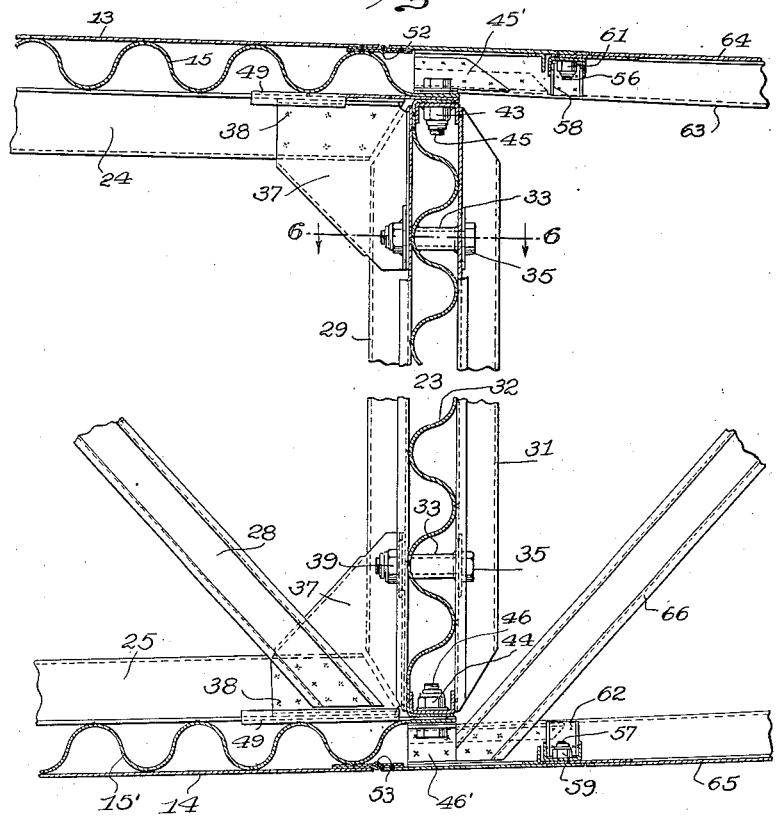
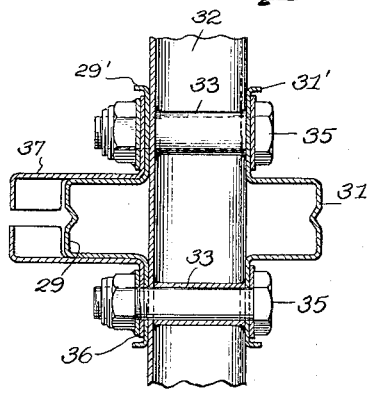

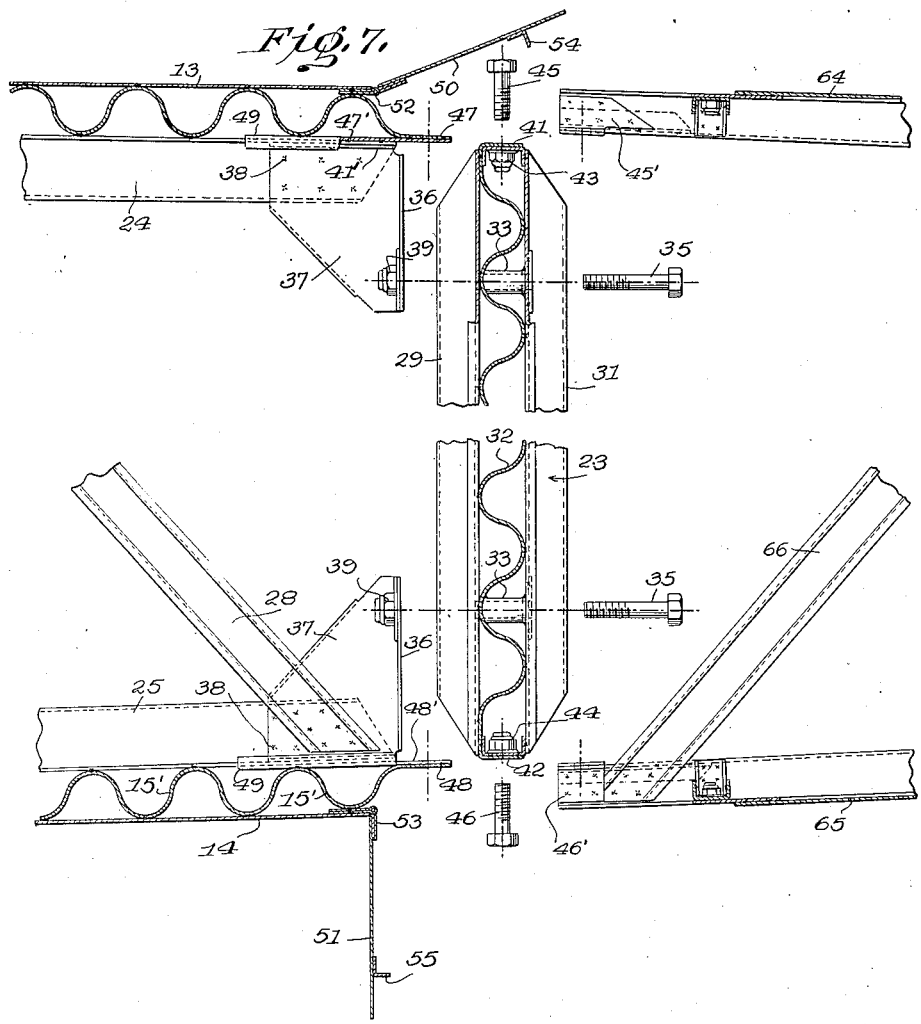

Patented June 26, 1945

2,379,352

UNITED STATES PATENT OFFICE 2,379,352

AIRCRAFT WING

George W. Hardman, Long Island City, N. Y., assignor to Edward G. Budd Manufacturing Company, Philadelphia, Pa., a corporation of Pennsylvania Application April 1, 1941, Serial No. 386,241

2 Claims. (Cl. 244—124)

The invention described in the present application, which is a continuation-in-part of my copending application Serial No. 281,079, filed June 26, 1939, now Patent No. 2,262,606, issued November 11, 1941, is directed to an improved sectional airplane wing construction.

The principal object of the present invention is to provide an airplane wing structure in which the various parts thereof may be constructed in the form of subassemblies, thus facilitating mass production.

Another object of the invention is to provide a sectional airplane wing construction wherein means are provided to separably connect the shear web and the forward and rear portions of the wing tip, and other associated parts, while maintaining a substantially unbroken airfoil contour, with a view to convenient assembly and disassembly, quick inspection, replacement and/or adjustment.

A further object is the provision of improved means for separably connecting the skin sheets of the forward or leading edge portion of an airplane to the longitudinally extending shear web and to the skin sheets of the rear or trailing edge portion of the wing in such wise as to assure a strong, reinforced structure, adapted for ready internal inspection, replacement, adjustment and the like and without break in the airfoil contour of the wing.

It is also an object to provide an aircraft wing of generally improved construction, whereby the structure will be more convenient, practical, serviceable and efficient in its use, than constructions heretofore employed.

With the foregoing and other objects in view, which will appear as the description proceeds, the invention resides in the combination and arrangement of parts and in the details of construction hereinafter described and claimed.

The invention will be best understood by reference to the drawings wherein:

Figure 1 is a top plan view of an airplane wing embodying the features of the invention;

Figure 2 is an enlarged transverse sectional view of the forward or leading edge portion of the outboard portion of the wing, and a forward part of the adjacent rear or trailing edge portion, taken substantially on the line 2—2 of Figure 1;

Figure 3 is a section of the rear part of the rear or trailing edge portion of the wing, taken substantially on the line 3—3 of Figure 1;

Figure 4 is a fragmentary plan view, with parts broken away, of an airplane wing in accordance with the present invention, and showing portions of the top and bottom skins, rib structure, shear web, and hinged skin panels connecting the skins of the forward and rear portions of the wing, together with certain other component parts;

Figure 5 is an enlarged fragmentary sectional view, similar to Figure 2, illustrating details of the wing construction and parts, depicted generally in the latter figure, and showing the forward portion, rear portion and shear web operatively connected, and the hinged skin panels of the forward portion of the wing, fastened to the rear portion thereof to preserve the airfoil contour;

Figure 6 is an enlarged fragmentary, sectional detail view, taken on the line 6—6 of Figure 5, certain parts being shown in elevation; and Figure 7 is an enlarged fragmentary sectional detail view of the wing structure depicted in Figure 5, but showing the hinged skin panels raised and the forward portion, shear web and rear portion disassembled.

Referring now to the drawings wherein similar numerals indicate corresponding parts in the several views of the preferred form of the invention, the numeral 8 designates generally the outboard portion of an airplane wing of the cantilever type, and 9 the portion of the wing adjoining the fuselage (not shown).

The portion 8 of the wing, which may be of the D spar type as best shown in Figure 2, and detachably secured to the portion 9 having the engine nacelle 10, includes a forward or leading edge portion 11 and a rear or trailing edge portion 12. The forward portion 11 comprises top and bottom stressed skins 13, 14, respectively, suitably stiffened and reinforced by corrugated backing metal 15 and 15', to prevent buckling thereof and improve the tension strength of the skin, the said skins being joined together at the nose by a tip plate 16 which is reinforced by Z members 17, 18, if desired. As illustrated diagrammatically in Figure 1, a plurality of ribs 19, 20, 21, 22, etc., are provided, these ribs extending transversely of the shear web, designated generally at 23, in order to give the wing surface the proper airfoil section.

In the wing structure of the type herein described, the forward portion of which has, in cross section, the form of an elongated D, the rib structures are composed of a pair of spaced chord members 24, 25, each having the curvature necessary to support the adjacent wing surface. These chord members 24, 25 are interconnected by a nose plate 25' and suitable diagonally extending braces or flanged channel members 26, 27, 28 arranged in truss formation and welded or otherwise secured thereto.

The detachably mounted shear web member 23 forming, with the leading edge portion, the D spar, as best shown in Figures 5 and 7, comprises vertical, hat-section flanged channel members 29, 31 arranged at intervals in spaced parallel relation on either side of a corrugated metal web member 32, and additionally reinforced at points adjacent the means provided for securing the sections together, by tubular spacing elements 33, which latter accommodate screw bolts 35 hereinafter described. The screw bolts 35, as best shown in Figure 6, are extended through the apertured flanges 29', 31' of the respective channel members 29, 31, and through apertures provided in the flanges 36 of the gusset plates 37 which are welded to their respective chords or ribs 24, 25 as at 38. The flange 36 on the vertical edge of each of the gusset plates 37, which is juxtaposed against one of the adjacent flanges 29', of the channel members 29, is provided with a nut 39 permanently fastened thereto and coactable with the adjacent screw bolt 35 to retain the shear web member 23 in fixed contact with the gusset plate 37 and consequently in operative attachment to the leading edge portion of the wing. Another flanged edge 41' of each gusset plate 37 is spot welded to the flange of the adjacent chord 24 or 25. The opposite ends of the corrugated web member 32 of the shear web 23 are each bent and reinforced by a channel, see Figs. 5 and 7, to provide an apertured reinforced flange or chord portion as at 41, 42 extended perpendicularly to the vertical plane of the said corrugated member 32. Nuts 43 44, permanently fastened on the reinforced flanges 41, 42 and in register with the apertures therein, are engaged by screw bolts 45, 46 protrudable through apertures located in extensions 47, 48 of the top and bottom corrugated backing members 15, 15' of the top and bottom skins 13, 14, respectively, and through registering holes (not shown) in gusset plates 45' and 46' fastened to adjacent ends of the rib structure 63 of the rear or trailing-edge portions (Figures 5 and 7). Each of the extensions 47, 48, as shown in the last-mentioned figures, is folded upon itself to form a backwardly directed portion or tongue 47', 48', respectively, which is further reinforced by a backing plate, as at 49.

The assembly of the forward portion with the shear web forms a D section torsion box of unusual strength, and, through the stressed upper and lower skins and the leading edge and shear web acting as spaced shear webs, a box-section cantilever of great strength results. Since the load of the plane is borne by this portion of the wing, and the trailing or remaining portion back of the shear web acts primarily as streamlining, the present invention does not contemplate stressing the trailing skin surface along the length of the wing, but, on the contrary, the trailing portion is carried from the shear web, and, through the operation of ailerons, 12', torsion stress alone is applied to the forward or leading-edge portion and the torsion box formed thereby.

In order to preserve the airfoil contour of the wing at the junction of the forward or leading-edge portion 11 and the rear or trailing-edge portion 12 of the wing tip and shear web 23, while affording the advantages accruing to the conveniently assembled and demountable structure above-described, airfoil contour skin panels or members 50, 51 are hinged to the inside surface of the top and bottom skins 13, 14, respectively, as at 52, 53. The hinged skin panels 50, 51, which are adapted to seat in flush, unbroken alignment with and form a continuation of the skins of the forward portion 11 and rear portion 12, are braced by angle members 54, 55.

Countersunk holes are arranged adjacent the outer edges of the hinged skin panels 50, 51 to receive screw bolts 56, 57 when the forward and rearward portions of the wing tip are brought together, as illustrated in Figure 5. The said countersunk holes then register with threaded holes in nuts 58, 59 fastened to the inner surface of channel members 61, 62 welded to the rib structure of the rear portion of the wing tip and to the top and bottom skin sheets 64 and 65 thereof. Similarly to the forward or leading edge portion, the rear or trailing-edge portion 12 is braced and strengthened, as by the diagonally extending channel members 66, 67 and 68.

From the foregoing description and the accompanying drawings, it will be apparent that the portion 8 of an airplane wing constructed in accordance with the present invention may be quickly assembled for service and that, whenever inspection is desired, the hinged skin panels 50, 51 may be raised after the screw bolts 56, 57 are removed, and examination of the shear web 23 and other parts made. The manner of disconnecting the forward portion 11 of the wing tip from the rear portion 12 and the shear web 23 is clearly indicated by inspection and comparison of Figures 5 and 7, and is accomplished by first removing the series of screw bolts 56, 57, swinging the hinged panels 50, 51 outwardly about the hinges 52, and then unscrewing the series of screw bolts 35, 45, 46 and removing same from the registering holes in the extensions 47, 48. Any structural damage, defect or deformation in the component parts of the wing described and illustrated may be quickly ascertained and conveniently serviced or replaced, as required.

In the above description, it is, of course, to be understood that the line of demarcation between those parts of the wing portion 8 herein referred to generally as the forward or leading-edge portion and the rear or trailing-edge portion is not a sharply defined one, and this is also true of the position of the shear web relatively to the longitudinal median plane of the wing. In all cases, however, it will be appreciated that the construction described and illustrated permits, in addition to the customary separability of the various wing sections known in the art, the convenient longitudinal separation of the wing or a portion thereof, into two fore and aft portions and the separable connection of these two portions to the shear web. These desirable features are achieved in a construction presenting exteriorly a smooth airfoil contour, the hinged skin panels 50, 51 forming a part of the same providing ready access to the interior whenever desired.

It is to be understood that its invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention; and it will be further understood that each and every novel feature and combination present in or possessed by the mechanism herein disclosed forms a part of the invention included in this application.

What is claimed is:

1. In an airplane wing structure, a main load-carrying box-section beam comprising a portion forming the leading edge of a wing and including stressed reinforced top and bottom metal skin structures interconnected at their leading ends by a rounded reinforced metal nose skin portion and arranged to act as vertically spaced generally horizontally disposed shear webs, and rigid metal interskin bracing structure stabilizing said skin structures, the trailing ends of said skin structures being formed with generally horizontally extending joint structures disposed substantially in the planes of the respective skin structures, and said bracing structure being formed, forwardly of said horizontal joint structures, with generally vertically extending joint structures, and a spanwise extending and generally vertically disposed metal shear web including a web portion and top and bottom chord portions interconnected by said web portion, said shear web being disposed with its web portion in direct overlapping engagement with said vertical joint structures and secured thereto in the overlap, and with its chord portions in direct overlapping engagement with the respective horizontally extending joint structures and secured thereto in the overlap.

2. In an airplane wing structure, a main load-carrying box-section beam comprising a portion forming the leading edge of a wing and including stressed reinforced top and bottom metal skin structures interconnected at their leading ends by a rounded reinforced metal nose skin portion and arranged to act as vertically spaced generally horizontally disposed shear webs, and rigid metal interskin bracing structure stabilizing said skin structures, the trailing ends of said skin structures being formed with generally horizontally extending joint structures disposed substantially in the planes of the respective skin structures, and said bracing structure being formed, forwardly of said horizontal joint structures, with generally vertically extending joint structures, and a spanwise extending and generally vertically disposed metal shear web including a web portion and top and bottom chord portions interconnected by said web portion, said shear web being disposed, in final assembly, with its web portion in direct overlapping engagement with said vertical joint structures and secured thereto in the overlap by readily removable means extending through said web portion, and with its chord portions in direct overlapping engagement with the respective horizontally extending joint structures and secured thereto in the overlap, so as to form a primary shear transmitting means between the joined parts, by readily removable means disposed wholly within the outer contour of the wing.

GEORGE W. HARDMAN.